US012468608B2

(12) United States Patent
Melton (10) Patent No.: US 12,468,608 B2
(45) Date of Patent: Nov. 11, 2025

(54) PAUSELESS END-OF-INTERVAL ROLLOVER WITH FAULT TOLERANCE

(71) Applicant: REFINITIV US ORGANIZATION LLC, New York, NY (US)

(72) Inventor: Hayden Melton, Philadelphia, PA (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 0 days.

(21) Appl. No.: 18/535,465

(22) Filed: Dec. 11, 2023

(65) Prior Publication Data

US 2024/0193056 A1    Jun. 13, 2024

Related U.S. Application Data

(60) Provisional application No. 63/432,013, filed on Dec. 12, 2022.

(51) Int. Cl.
*G06F 11/00* (2006.01)
*G06F 11/20* (2006.01)
*G06F 11/14* (2006.01)

(52) U.S. Cl.
CPC ...... *G06F 11/2023* (2013.01); *G06F 11/2097* (2013.01); *G06F 11/1446* (2013.01); *G06F 11/1471* (2013.01)

(58) Field of Classification Search
CPC ............. G06F 11/1446; G06F 11/1471; G06F 11/2023; G06F 11/2097
See application file for complete search history.

(56) References Cited

U.S. PATENT DOCUMENTS 7,818,223 B1    10/2010  Campbell et al.
11,228,529 B1    1/2022  Amicangioli et al.
2014/0040194 A1*  2/2014  Krasensky ............. H04L 47/34
                                              707/613
2018/0047099 A1    2/2018  Bonig et al.
2022/0044319 A1*  2/2022  Amicangioli ........ G06Q 20/027

FOREIGN PATENT DOCUMENTS

WO    2022/031975 A1    2/2022

OTHER PUBLICATIONS

International Search Report and Written Opinion issued in International Patent Application No. PCT/IB2023/062456, dated Mar. 6, 2024.

* cited by examiner

*Primary Examiner* — Elmira Mehrmanesh
(74) *Attorney, Agent, or Firm* — Pillsbury Winthrop Shaw Pittman, LLP (57) ABSTRACT

Systems and methods of pauseless end-of-interval rollovers are described to provide rollover processing with fault tolerance. A system may execute first and second instances of a matching engine for fault tolerance. Each instance by design is deterministically programmed to perform paused end-of-interval (EOI) rollover processing in which orders may be received without blocking by transmitting loopback messages that indicate to-be-expired messages. The sequencer may sequence the loopback messages along with new order messages. Each instance may continue to receive sequenced messages, which may include loopback messages it or the other instance sent, and expire the order corresponding to the loopback message or the counterpart loopback message, wherein expiration of the order occurs on both the first instance and the second instance without blocking new messages from the sequencer.

20 Claims, 6 Drawing Sheets

PAUSELESS END-OF-INTERVAL ROLLOVER WITH FAULT TOLERANCE

CROSS-REFERENCE TO RELATED APPLICATIONS

This application claims priority to U.S. Provisional Patent Application No. 63/432,013, filed Dec. 12, 2022, entitled "Pauseless End-of-Day Rollover," which is incorporated by reference in its entirety herein.

BACKGROUND

From a computational and engineering perspective, it is often advantageous to suspend inputs to, outputs from, and execution of a computer program so bookkeeping-like tasks can be performed on that program. One example of this is automatic memory management, which is also known as garbage collection. Widely used garbage collection algorithms suspend the execution of a running program when they perform heap-compacting operations associated with that program's memory management.

While suspending a program may be advantageous from an engineering perspective because it can simplify the implementation of bookkeeping operations being performed, disadvantageously such suspension can be detrimental to program throughput because while such bookkeeping operations are performed, the program is unable to continue execution. This issue is sometimes referred to as a blocking problem because the bookkeeping or other operations block continued execution of the program. Blocking can arise in various contexts in which an operation causes a program or computational system to pause execution. Furthermore, blocking may be exacerbated by faults in the program or computer system. A fault is a condition that causes the program or computer system to no longer run normally, such as by failing or otherwise not being accessible. Faults can lead to service and/or data loss.

BRIEF DESCRIPTION OF THE DRAWINGS

Features of the present disclosure may be illustrated by way of example and not limited in the following Figure(s), in which like numerals indicate like elements, in which.

DETAILED DESCRIPTION

Systems and methods of pauseless end-of-interval rollovers are disclosed to provide rollover processing with fault tolerance. While garbage collection is a system-level bookkeeping operation that suspends a program's execution, application-specific bookkeeping operations may also exist that have the effect of suspending a program's execution. In computer applications for a financial exchange for instance, there is an end-of-day rollover operation during which expired orders (e.g., those with a time-in-force of 'day') are removed from their limit order books, and a start-of-day 'checkpoint' of the state of the book containing all its open orders is persisted. For ease of implementation, this end-of-day rollover suspends processing of inbound order messages sent to the exchange by the participants on it. In markets such as the spot foreign exchange (FX) market that operate continuously (e.g., a week), this approach to the end-of-day rollover operation disadvantageously means orders sent during this operation are not processed by the exchange in a timely fashion or are processed differently from how they otherwise would have been had they been received outside of this operation.

To support end-of-day rollovers, a message indicating that end-of-day rollover is sequenced and sent to a matching engine instance. In that conventional implementation the receipt of that message causes a matching thread (1) to remove all expired orders from the limit order book and (2) to create a checkpoint of the start-of-day book by persisting to disk or another component all the open orders that remain in it. During the time taken for operations (1) and (2) above to complete, if any new order messages are received from participants, those messages must be queued. In this approach, operations (1) and (2) are said to be 'blocking' because the matching engine thread is prevented from processing any inbound orders until both (1) and (2) have completed. Also in this approach, the removal of expired orders is said to be "eager" or "greedy" (as opposed to "lazy") because their removal from the limit order book occurs as soon as possible.

To address the foregoing and other issues, a computer system is improved to conduct non-blocking, pauseless end-of-interval ("EOI") rollovers with fault tolerance. For example, pauses that are otherwise observable in the processing of new order messages during an EOI rollover operation are eliminated by, for example, making operations (1) and (2) from above non-blocking, and by removing expired orders lazily. Furthermore, the computer system uses two or more instances of the matching engine for fault tolerance, in which are each instance is deterministically programmed to perform pauseless EOI rollovers.

The ETV may include a sequencer and at least two instances of a matching engine. The sequencer receives, sequences, and transmits messages to each of the matching engine instances to ensure that the same messages are sent to each matching engine instance in the same order. The received messages may include messages from market participants and/or loopback messages (discussed below) from each of the matching engine instances. When an EOI rollover should occur (such as at the end of the day or other interval), the sequencer may transmit an EOI rollover message to each matching engine instance.

Upon receipt of the EOI rollover message from the sequencer, each matching engine instance may execute a matching thread that identifies the first order to expire. Each matching engine instance may generate a loopback message indicating the first order that is to be expired and transmits the loopback message back to the sequencer. The sequencer may sequence the loopback message with other messages (or send the loopback message by itself), and transmit the loopback message to each matching engine instance. Each matching engine then transmits a subsequent loopback message to the sequencer indicating that next order is to be expired, and the process continues like this until no such orders requiring removal due to expiration remain in the limit order book. Matching threads at each matching engine instance may ensure the ordering in which expired orders are identified is the same simply by scanning the limit order book from 'top' to 'bottom' such as highest ask price down to lowest bid price, and from oldest to newest order at each price-level therein.

In the scheme described above, two or more loopback messages indicating expiry are sent for a given order-one from each of the matching engine instances. The sequencer will sequence all such loopback messages and upon their receipt each matching engine will use the earlier of the loopback messages to remove the order, ignoring the later of the other loopback messages since the order in question will already have been removed. Advantageously, it is immaterial—and indeed may vary from message to message—which instance has its loopback messages sequenced first.

Also in the scheme described above inbound order messages from market participants may interleave with the loopback messages sent from the matching engine instances indicating expiration of an order. This is a deliberate feature of the design and is largely what allows the pauselessness attribute of the EOI rollover. In the case that a taker order is received after the EOI rollover message that would match with an order that is expired but has not had its corresponding loopback message sent, the processing of that taker order will cause the matching thread to remove any such expired orders from the book. In this case it will not be necessary to transmit any loopback messages for those orders at all.

To indicate that EOI rollover is complete, each of the matching engines may transmit a loopback message indicating such when no expired orders remain in the book. Such a condition may be determined if the scanning of the limit order from 'top' to 'bottom' is completed.

Pauseless EOI rollover with fault tolerance may improve performance and failover protection of the ETV, but may increase network latency. For example, the cost of transmitting a loopback message may be high in terms of network bandwidth usage relative to the payload that the loopback message carries. To address this problem, in some implementations, each matching engine instance may add a plurality of expiring orders (and not just one) into a single such loopback message. Furthermore, if too many loopback messages are sent in quick succession that may starve the matching threads processing of inbound order messages from participants causing them to observe a delay or pause in processing those messages. Conversely, if loopback messages are too heavily throttled then the EOI rollover may take an excessive amount of time to complete. This may also cause problems for participants who are receiving notifications many seconds after EOI that their orders have indeed been expired by the exchange. In both cases appropriate throttling of the transmitting the loopback messages by the sequencer or by implementing a 'send queue' for loopback messages at the matching engine with its own thread. In this way throttling (e.g., by transmitting at most one loopback message every millisecond) may allow an appropriate balance to be struck between expedient completion of the EOI rollover, and expedient processing of order messages from participants received during EOI rollover.

Having completed the description of an embodiment for making the first operation (removing expired orders) in EOI rollover pauseless, attention will now be turned to making the second operation in EOI rollover (generating a start of day checkpoint) pauseless. In some implementations, each matching engine instance may log sequenced messages received from the sequencer to its local disk. In this implementation, a snapshotting process distinct from the matching thread is launched upon receipt of the EOI rollover message.

The snapshotting process executed by the ETV reads in the previous EOI snapshot and the messages received since that previous EOI snapshot to generate the current EOI snapshot. If the messages are written to the local disk by the matching engine instance in the order they are received and the sequence number for each message is persisted then, the snapshotting process may read in the previous EOI snapshot, read in messages with a sequence number strictly greater than the previous EOI snapshot and strictly less than today's (current) EOI snapshot. What is left at the conclusion of this read-in/replay process is the current EOI snapshot. EOI snapshot may be taken at the same intervals as the EOI rollover. The EOI snapshots may be written to a storage area network, or sent by the process generating them (e.g., via TCP/IP) to a separate application that requires or makes use of those EOI snapshots, such as for compliance reporting, recovery, and/or other purposes.

Figure 1:
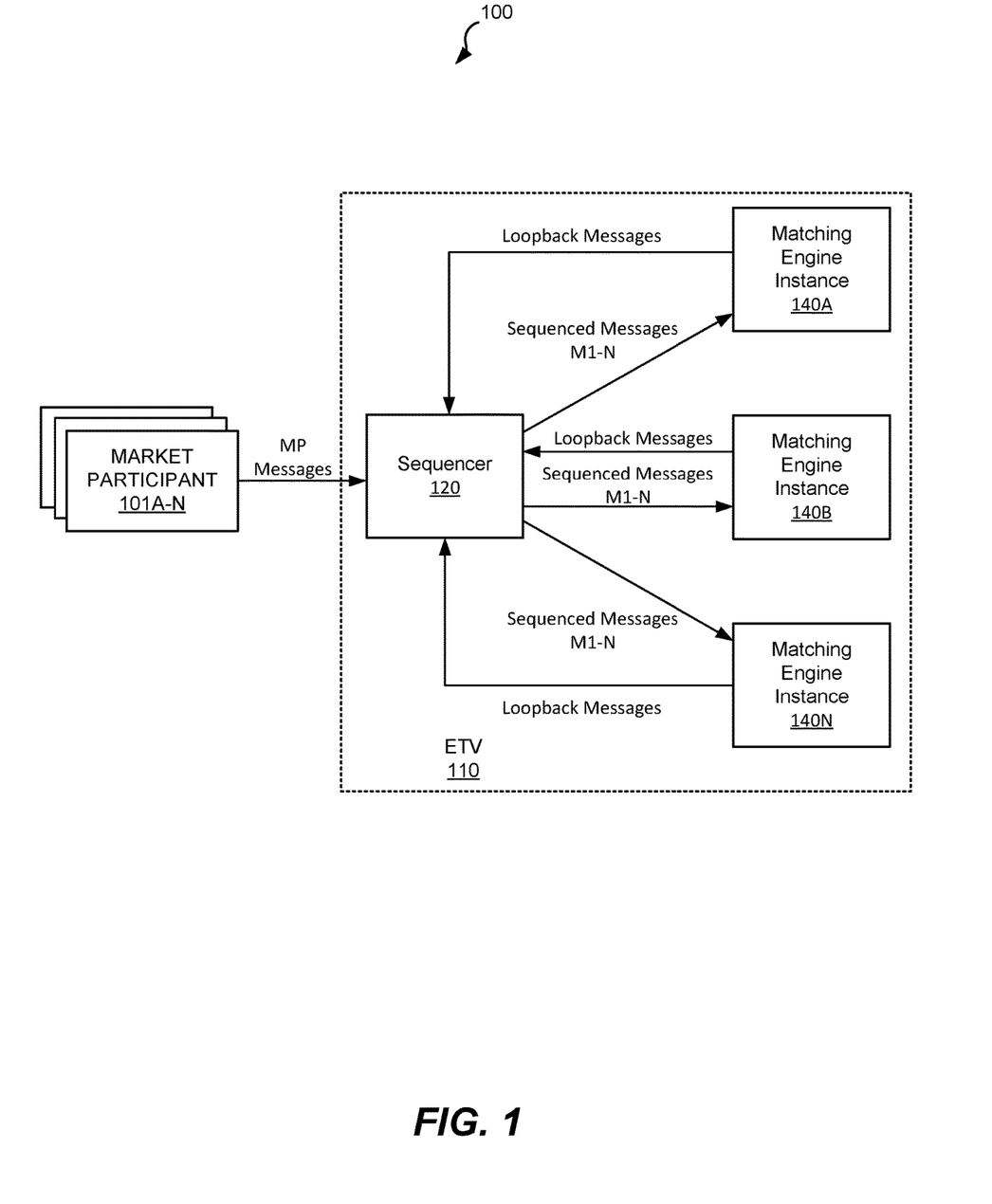
FIG. 1 illustrates an example of a computer system of an electronic trading venue for pauseless end-of-interval ("EOI") rollovers with fault tolerance.

FIG. 1 illustrates an example of a computer environment 100 of an electronic trading venue 110 for pauseless end-of-interval ("EOI") rollovers with fault tolerance. The computer environment may include a plurality of market participants 101 (illustrated as market participants 101A-N), an electronic trading venue ("ETV 110"), and/or other component.

Each market participant 101 may submit one or more messages ("MP messages") to the ETV 110. The term "market participant" is intended to be broadly construed to refer to any entity that receives (through a computing device) market data from the venue, or sends (through a computing device) order-related messages to the venue, including, but not limited to: a firm that conducts business on the electronic trading venue, a credit entity associated with such a firm (a single firm may have a plurality of credit entities), or a user (human or otherwise). The infrastructure between the market participants and the ETV 110 (such as order gateways and market data distributors are well-known and therefore omitted from FIG. 1 for clarity). Each MP message may specify an order to be matched with other orders at the ETV 110. The order may be a maker order, a taker order, a cancel order, or other type of order.

The ETV 110 may include a sequencer 120, a plurality of matching engine instances 140A-N, and other system components, which are omitted for clarity. Examples of other components of the ETV 110 is described in U.S. Pat. No. 10,325,317, issued on Jun. 18, 2019, the entirety of which is incorporated by reference herein for all purposes.

The sequencer 120 receives, sequences, and transmits messages to matching engine instances 140 to ensure that the same messages are sent to each matching engine instance 140 in the same order. The received messages may include MP messages from market participants 101 and/or loopback messages (discussed below) from one or more (usually at least two) matching engine instances 140.

The sequencer 120 may sequence the received messages according to a particular order to generate sequenced messages $M_{1-N}$. For example, upon receipt of a message, the sequencer 120 may assign a sequence number, a timestamp, and/or other indication of the order of the message with respect to another message. In some implementations, the sequencer 120 may add the message in a queue of sequenced messages $M_{1-N}$ for transmission to two or more of the matching engine instances 140A-N, where it is processed in order of its sequence number. For order matching, sequencing messages ensures that all orders are processed fairly and efficiently. It may also prevent traders from front-running each other's orders, which is a form of market manipulation. For failover protection, the sequencer 120 will transmit the same messages in the same order to each matching engine instance 140 to ensure that each matching engine instance 140 is provided with the same input message. Providing each matching engine instance 140 with the same sequence messages $M_{1-N}$ will be used by the ETV 110 to address the problem of blocking during EOI rollovers and potential faults that can occur at a matching engine.

The sequencer 120 may transmit the sequenced messages $M_{1-N}$ to two or more of the matching engine instances 140. For example, the sequencer 120 may transmit the sequenced messages $M_{1-N}$ to the matching engine instance 140A and also transmit the same sequenced messages $M_{1-N}$ to the matching engine instance 140B. In this way, the matching engine instances 140A and 140B are each provided with the same sequenced messages $M_{1-N}$.

When a rollover is to occur, the sequencer 120 may transmit an EOI rollover message to each of two or more matching engine instances 140. Such EOI rollovers may occur at various intervals, which may be specified by the ETV 110. For example, an EOI rollover may occur every five minutes, every hour, every day (in which case the EOI rollover may be referred to as an EOD rollover), every week, and/or at other intervals. An EOI rollover message is a message that indicates that an EOI rollover is to be initiated and to-be-expired orders are to be expired. Responsive to receipt of the EOI rollover message, each matching engine instance 140 will trigger EOI processing.

Each matching engine instance 140 may—by deliberate design—be programmatically deterministic. That is, when implemented in source code, the ETV 110 will instantiate the same copy of the source code to generate two or more matching engine instances 140. Each matching engine instance 140 will usually be isolated from other matching engine instances 140. For example, each matching engine instance 140 may be provided with its own set of input data (such as the same sequenced messages $M_{1-N}$) and its own configuration settings. Thus, multiple instances of a matching engine may be concurrently and independently executed at the ETV 110 without interfering with one another. Because each matching engine instance 140 is executed from the same source code with identical configurations and input data, processing functionality will be deterministic (the same output given the same input) across the two or more matching engine instances 140.

For example, the matching engine instance 140A and the matching engine instance 140B may each be instantiated using the same source code and be provided with the same sequenced messages $M_{1-N}$. Thus, both the matching engine instance 140A and the matching engine instance 140B will process the sequenced messages $M_{1-N}$ in the same way and produce the same output from such processing. Thus, determinism and consistency may be achieved by providing the same sequenced messages $M_{1-N}$ to each matching engine instance 140 and because of the way each matching engine instance 140 is programmed and executed.

Two or more matching engine instances 140 may concurrently execute in a "live" production environment. In this way, one matching engine instance 140 may be redundant with another matching engine instance 140. This redundancy enables failover protection. In the event that one matching engine instance 140 fails or otherwise becomes unavailable for matching orders, another matching engine instance 140 may be used as a backup. In some implementations, two live matching engine instances 140A and 140B may be concurrently executed. In these implementations, a first matching engine instance 140A may be considered a primary instance and a second matching engine instance 140B may be considered a secondary instance that is used as a backup in the event that the primary instance is offline or is otherwise unavailable. Since both are given the same input (sequenced messages $M_{1-N}$) and have been programmed with the same logic, both instances will produce the same match result and therefore provide fault tolerance in the event that a first instance fails or is otherwise unavailable. One or more other matching engine instances 140 may be concurrently executed as well.

Figure 2:
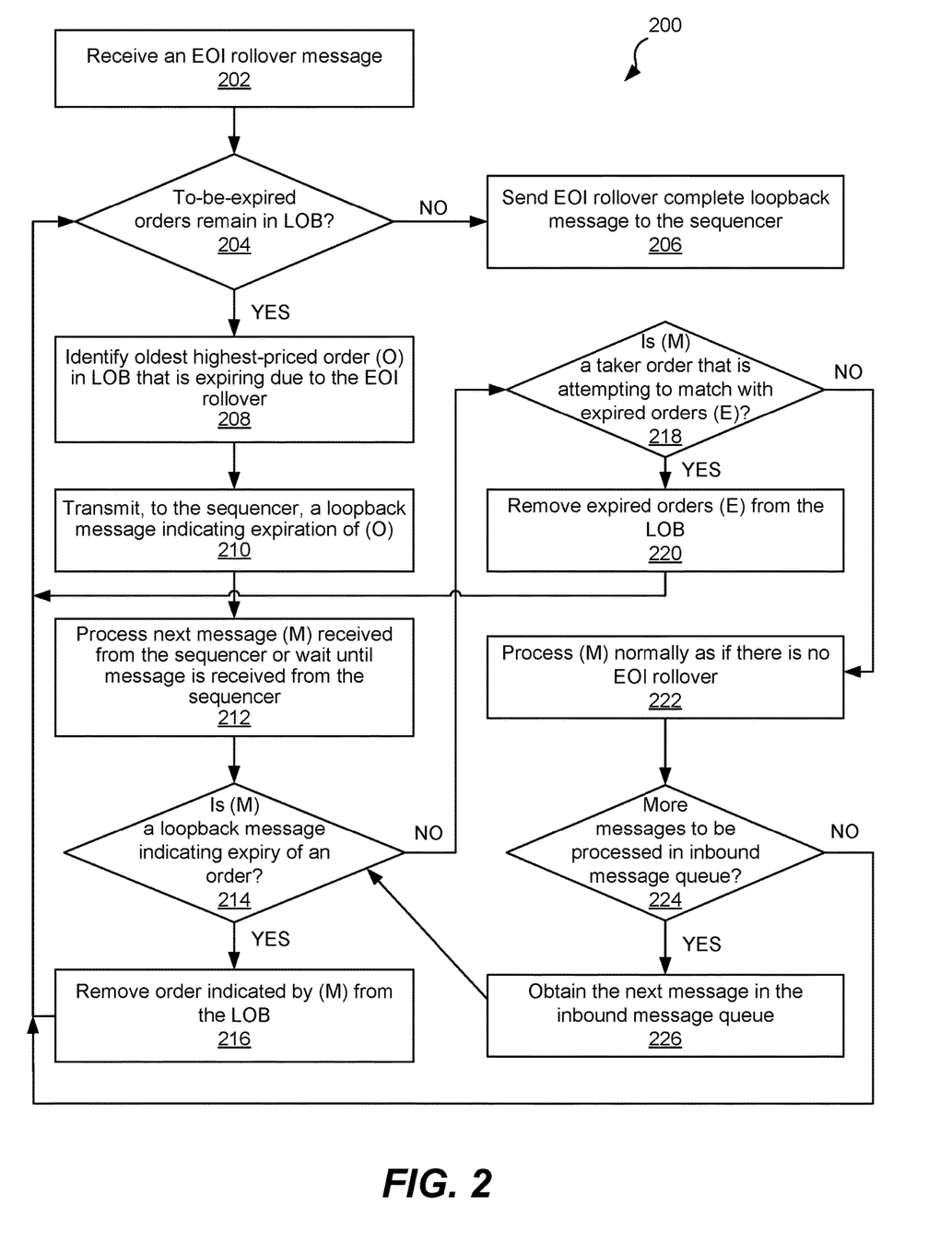
FIG. 2 illustrates a method of pauseless EOI rollover at an instance of a matching engine.

FIG. 2 illustrates a method 200 of pauseless EOI rollover at an instance of a matching engine (such as matching engine instance 140A, 140B, and/or 140N). Each matching engine instance 140 may be deterministically programmed to execute the method 200. The method 200 will be described with reference to various components illustrated in FIG. 1.

At 202, the method 200 may include receiving an EOI rollover message from the sequencer 120. The EOI rollover message may initiate EOI processing at the matching engine instance 140.

At 204, the method 200 may include determining whether there are any to-be-expired orders remaining in a limit order book (LOB) maintained by the matching engine instance 140. A limit order book is a record of all outstanding limit orders for a given financial instrument. A limit order is an order to buy or sell a financial instrument at a specific price or better. Limit orders may be placed by market participants 101 that wish to control the price at which they buy or sell the financial instrument.

If there are no more to-be-expired orders remaining in the LOB, at 206, the method 200 may include transmitting an EOI rollover complete loopback message to the sequencer 120. The EOI rollover complete loopback message may indicate to the sequencer 120 that the EOI rollover has been completed at the matching engine instance 140.

If there are to-be-expired orders remaining in the LOB, at 208, the method 200 may include identifying the oldest, highest-priced order (O) in the LOB that is expiring due to the EOI rollover (and the order (O)'s expiration date).

At 210, the method 200 may include generating a loopback message indicating expiration of the order (O) and transmitting the loopback message to the sequencer 120. The sequencer 120 will sequence the loopback message along with other messages and then transmit these sequenced messages to the matching engine instance 140. It should be noted that the order (O) is not greedily removed from the LOB immediately, but rather is lazily removed from the LOB later, after having received the loopback message (or counterpart loopback message described below) back from the sequencer 120.

At 212, the method 200 may include processing the next message (M) received from the sequencer 120 or waiting until a message (such as a sequenced message) is received from the sequencer 120.

At 214, the method 200 may determining whether message (M) is a loopback message indicating expiry of an order. If the message (M) is a loopback message indicating expiry of an order, at 216, the method 200 may include removing the order corresponding to the message (M) from the LOB and then return to 204. Again, this removal is a lazy removal of the order as previously noted.

Returning to 214, if the message (M) is not a loopback message indicating expiry of an order, at 218, the method 200 may include determining whether the message (M) includes a taker order that is attempting to match with one or more expired orders (E). If yes, at 220, the method 200 may include removing the expired orders (E) from the LOB, and returning to 204. If no, at 222, the method 200 may include processing the message (M) normally (as if there is no EOI rollover).

At 224, the method 200 may include determining whether there are more messages to be processed in the inbound message queue. If yes, at 226, the method 200 may include obtaining the message in the inbound message queue and returning to 214 to determine whether the next message is a loopback message indicating expiry of an order. Returning to 224, if there are no more messages to be processed in the inbound message queue, the method 200 may return to 204.

Figure 3:
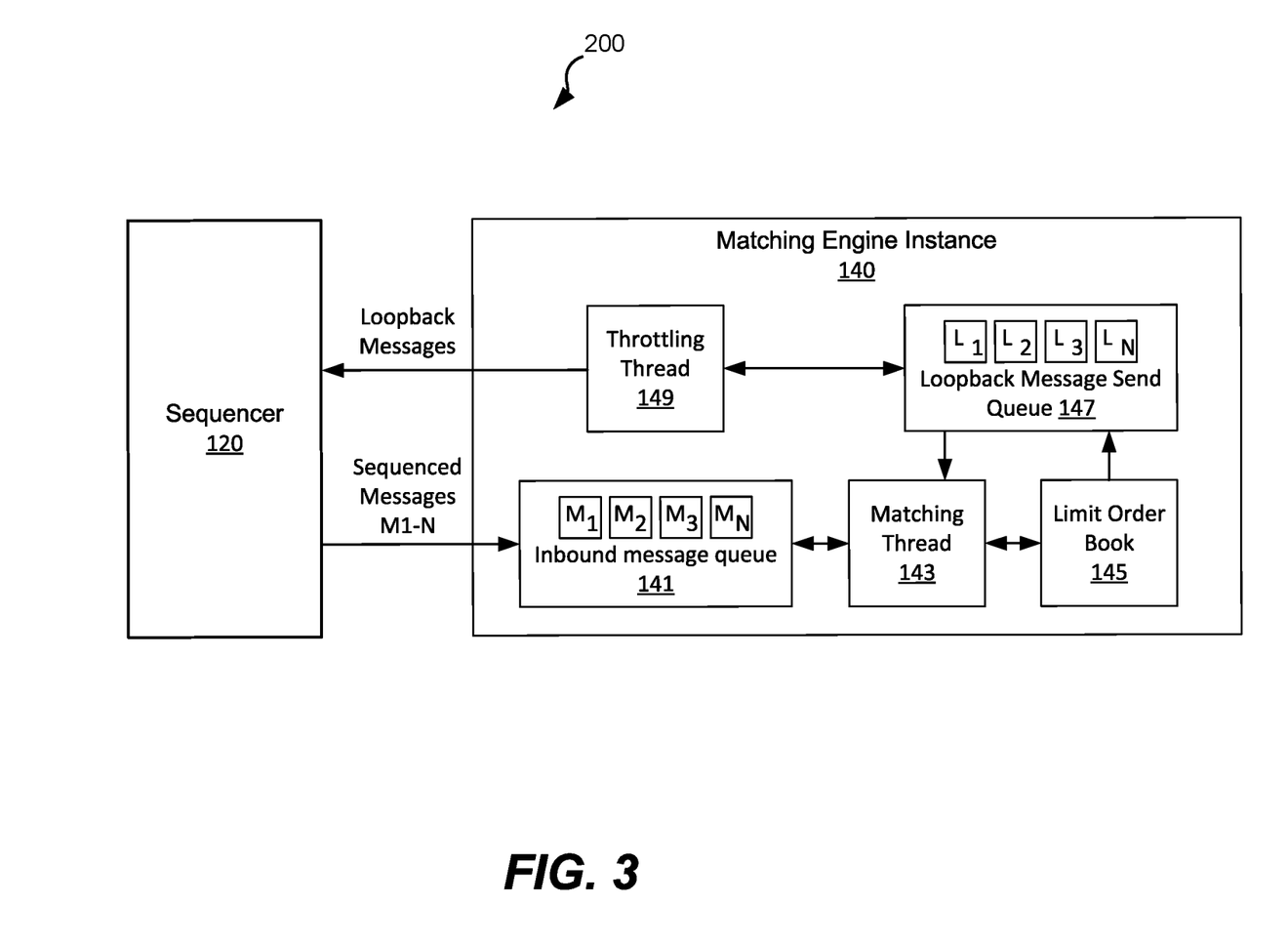
FIG. 3 illustrates an example of a matching engine instance that performs pauseless EOI rollover with throttled loopback messaging.

FIG. 3 illustrates an example of a matching engine instance 140 that performs pauseless EOI rollover with throttled loopback messaging. Each matching engine instance 140A-N illustrated in FIG. 1 may be configured and operate as illustrated in FIG. 3. The discussion of FIG. 3 that follows will include reference numbers of, and therefore reference to, FIG. 1.

The matching engine instance 140 may store the sequenced messages $M_{1-N}$ from the sequencer 120 into an inbound message queue 141. The matching engine instance 140 may execute a matching thread 143 to match orders submitted by market participants 101. A "thread" is a computational process, executed by a computer system such as one illustrated in FIG. 6. In some implementations, a parent process may execute a thread, in which case the thread may share the memory and resources of its parent process. A given parent process may execute multiple threads concurrently, which means that multiple threads can be running at the same time on the same CPU. In other implementations, different threads may run on different CPUs.

The matching thread 143 may perform matching made based on rules defined by the ETV 110 and orders in a limit order book 145. The matching thread 143 may perform matching using pauseless rollover EOI with fault tolerance techniques illustrated in FIGS. 1 and 2. Pauseless EOI rollover with fault tolerance may improve performance and failover protection of the ETV 110, but may increase network latency. For example, the cost of transmitting a loopback message may be high in terms of network bandwidth usage relative to the payload that the loopback message carries. To address this problem, in some implementations, each matching engine instance 140 may add a plurality of expiring orders (and not just one) into a single such loopback message. Furthermore, if too many loopback messages are sent in quick succession that may starve the matching threads processing of inbound order messages from participants causing them to observe a delay or pause in processing those messages. Conversely, if loopback messages are too heavily throttled then the EOI rollover may take an excessive amount of time to complete. This may also cause problems for participants who are receiving notifications many seconds after EOI that their orders have indeed been expired by the exchange.

In some implementations, transmission of loopback messages by the sequencer 120 and/or by each matching engine instance 140 may be throttled. For example, each matching engine instance 140 may implement a loopback message send queue 147 for loopback messages ($L_{1-N}$) and a throttling thread 149 for throttling transmission of the loopback messages in the loopback message send queue 147. The throttling thread 149 may selectively transmit one or more loopback messages based on one or more throttling parameters. A throttling parameter defines a number or rate of loopback messages to be transmitted, such as to the sequencer 120. A throttling parameter therefore controls the number or rate of loopback messages that are transmitted from the matching engine instance 140. The throttling parameter may be configurable and initially predefined based on particular needs, such as available bandwidth, network performance, and/or other factors. For example, the throttling parameter may be initially predefined to be one loopback message every millisecond, but can be later configured as appropriate.

In this way, throttling may allow an appropriate balance to be struck between expedient completion of EOI rollover, and expedient processing of order messages from participants received during EOI rollover. It should be noted that the sequencer 120 may similarly throttle sequenced messages $M_{1-N}$ for transmission to each matching engine instance 140.

Figure 4:
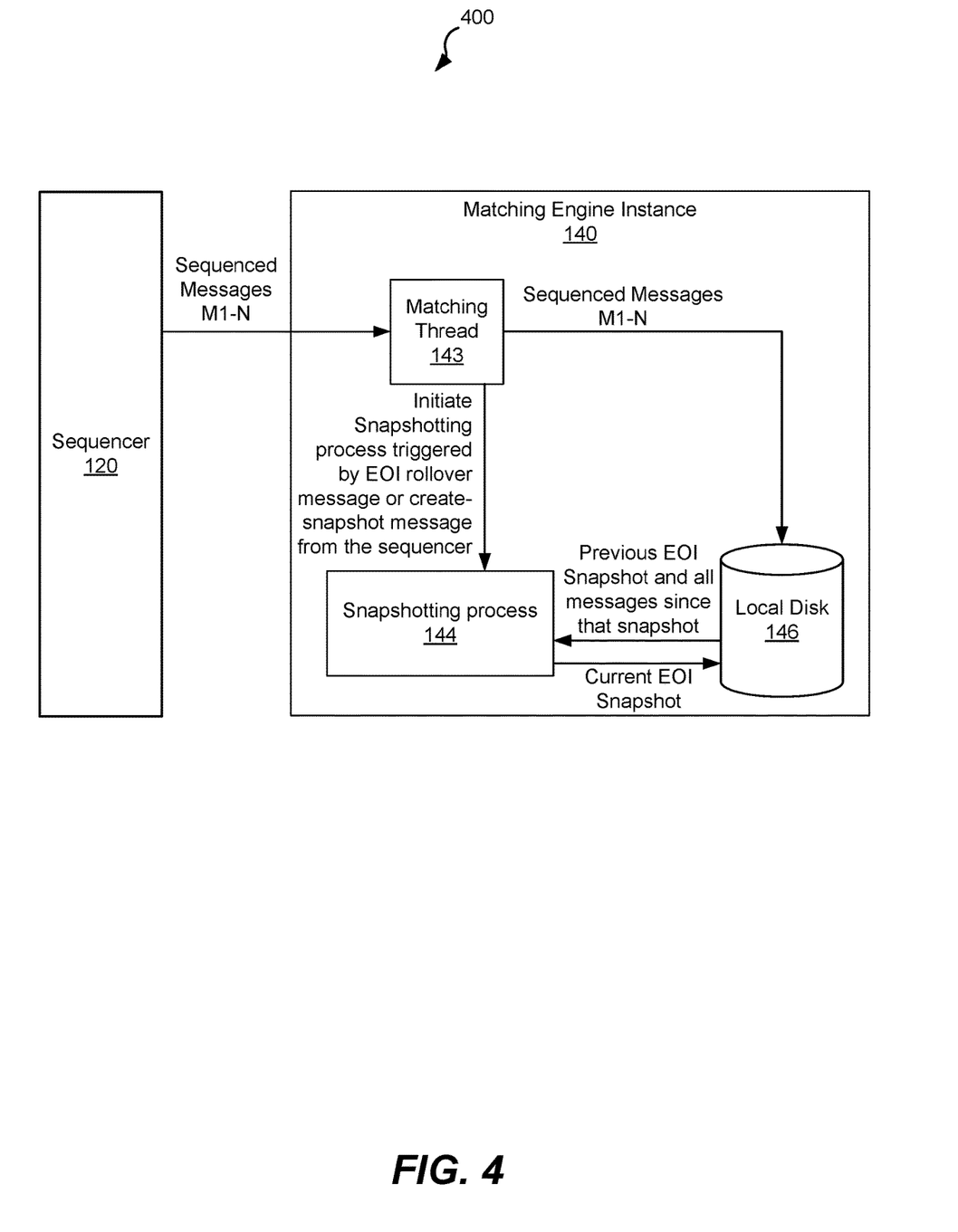
FIG. 4 illustrates an example of a matching engine instance that performs pauseless EOI rollover with snapshot generation.

Having completed the description of an embodiment for making the first operation (removing expired orders) in EOI rollover pauseless, attention will now be turned to making a second operation (generating a start of day checkpoint) in EOI rollover pauseless. For example, FIG. 4 illustrates an example of a matching engine instance 140 that performs pauseless EOI rollover with snapshot generation. Each matching engine instance 140A-N illustrated in FIG. 1 may be configured and operate as illustrated in FIG. 4. The discussion of FIG. 4 that follows will include reference numbers of, and therefore reference to, FIG. 1.

In an implementation, the matching engine instance 140 stores the sequenced messages $M_{1-N}$ received from the sequencer 120 at its local disk 146 or other storage accessible to the matching engine instance 140. In this implementation, upon receiving an EOI rollover message or a create-snapshot message from the sequencer 120, the matching engine instance 140 may initiate a snapshotting process 144. The snapshotting process 144 may read, from the local disk 146, a previous EOI snapshot and all messages received since that previous EOI snapshot to generate a current EOI snapshot. If the messages are written to disk by the matching engine instance 140 in the order they are received and the sequence number for each message is persisted, the snapshotting process 144 may read in the previous EOI snapshot, read in all messages with a sequence number strictly greater than the previous EOI snapshot (such as the greatest sequence number in the previous EOI snapshot) and strictly less than today's EOI snapshot. What is left at the conclusion of this read-in/replay process is the current EOI snapshot, which contains messages in the current EOI snapshot.

The EOI interval that defines the interval for which each snapshot is created, may be daily or other interval, such as every five minutes, every hour, every week, and so forth. What may further be apparent to someone skilled in the art is that the additional snapshotting process may be deliberately throttled (e.g., through its own application code, through pinning it to a specific CPU, or through operating system priority assignment) so processing of the snapshot does not starve or adversely affect the real-time processing of orders occurring on the same computer by the matching engine process. The snapshots generated may be written to a storage area network, or sent by the process generating them (e.g., via TCP/IP) to a separate application that requires or makes use of those snapshots.

It should be noted that each matching engine instance 140A-N illustrated in FIG. 1 configured and operate as illustrated in FIG. 3 and FIG. 4, as well as other combinations described herein. For instance, each matching engine instance 140A-N may be configured to perform pauseless EOI rollovers with fault tolerance, pauseless EOI rollovers with fault tolerance including throttling, pauseless EOI rollovers with fault tolerance including snapshotting, or pauseless EOI rollovers with fault tolerance including throttling and snapshotting.

Figure 5:
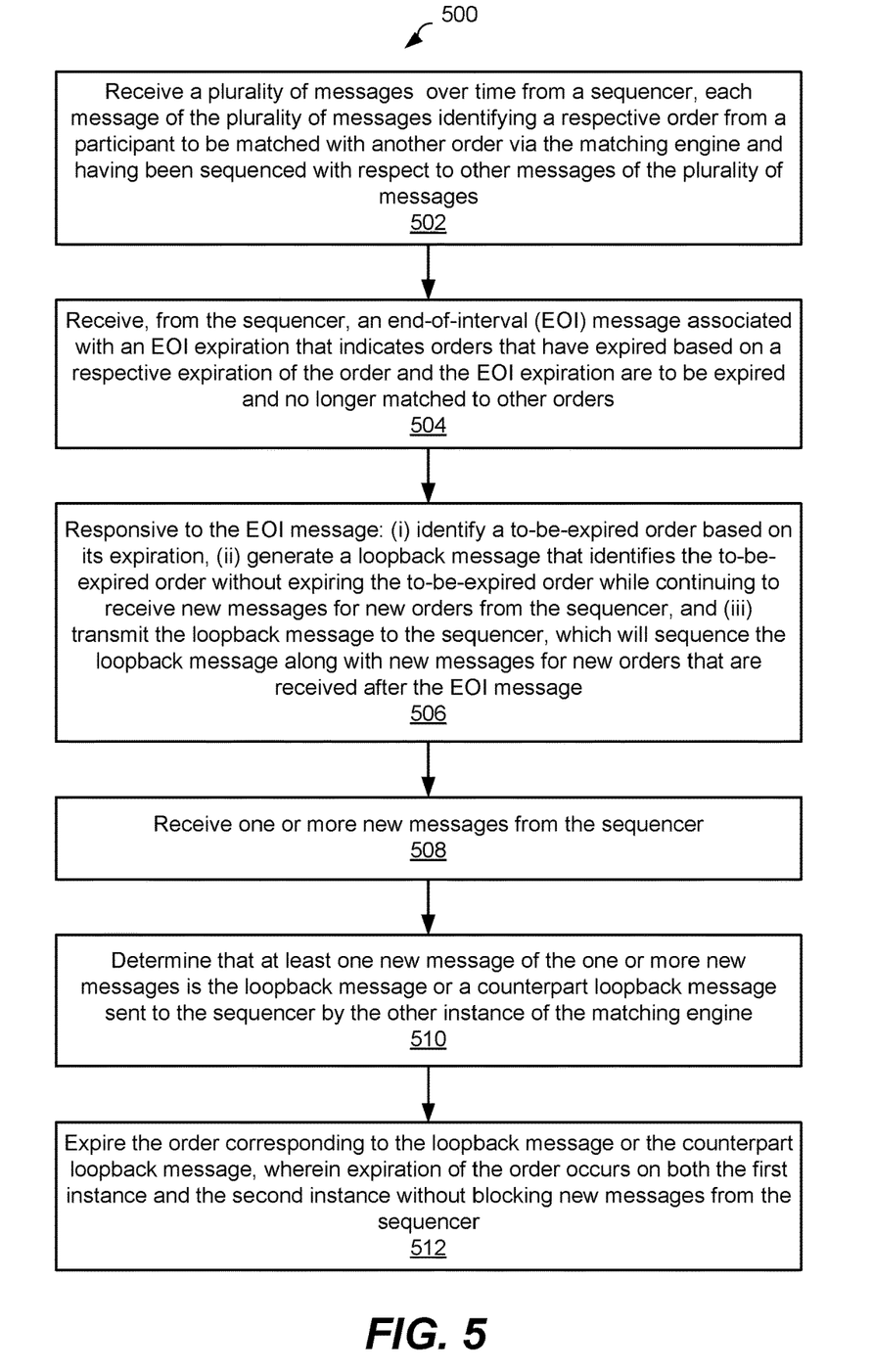
FIG. 5 illustrates a method of at least two instances of a matching engine that each perform pauseless EOI rollover with fault tolerance.

FIG. 5 illustrates a method 500 of at least two instances of a matching engine (such as matching engine instance 140A and matching engine instance 140B) that each perform pauseless EOI rollover. Together, the matching engine instance 140A and matching engine instance 140B may further enable fault tolerance because the outage or unavailability of one is mitigated by operation of the other.

At 502, the method 500 may include receiving, by each of the first and second instances, a plurality of messages over time from a sequencer (such as sequencer 120). Each message of the plurality of messages may identify a respective order from a participant to be matched with another order via the matching engine and may have been sequenced with respect to other messages of the plurality of messages. An example of the plurality of messages is the sequenced messages $M_{1-N}$. Each order may have an expiration after which the order should no longer be matched.

At 504, the method 500 may include receiving, by each of the first and second instances, from the sequencer, an end-of-interval (EOI) message associated with an EOI expiration that indicates orders that have expired based on a respective expiration of the order and the EOI expiration are to be expired and no longer matched to other orders.

At 506, the method 500 may include, responsive to the EOI rollover message, identifying, by each of the first and second instances, a to-be-expired order based on its expiration, generating a loopback message that identifies the to-be-expired order without expiring the to-be-expired order while continuing to receive new messages for new orders from the sequencer, and transmitting the loopback message to the sequencer, which will sequence the loopback message along with new messages for new orders that are received after the EOI rollover message.

At 508, the method 500 may include receiving, by each of the first and second instances, one or more new messages from the sequencer. The one or more new messages may be sequenced with respect to one another.

At 510, the method 500 may include determining, by each of the first and second instances, that at least one new message of the one or more new messages is the loopback message or a counterpart loopback message sent to the sequencer by the other instance of the matching engine.

To illustrate loopback messages and counterpart loopback messages, the following example will assume that the matching engine instance 140A sent a loopback message pertaining to an order to the sequencer 120 and that the matching engine instance 140B also sent a loopback message pertaining to the same order to the sequencer 120 (this is because both matching engine instance 140A and matching engine instance 140B are deterministically programmed and provide the same result given the same input). The loopback message sent by the matching engine instance 140B in this example can be referred to as a counterpart loopback message to the loopback message sent by the matching engine instance 140A.

It should be further noted that the matching engine instance 140A will receive, from the sequencer 120, both the loopback message it sent and its counterpart loopback message sent by the matching engine instance 140B pertaining to the same order. Likewise, the matching engine instance 140B will receive, from the sequencer 120, both the loopback message it sent and its counterpart loopback message sent by the matching engine instance 140A pertaining to the same order.

Each matching engine instance 140A and 140B will process either the loopback message or the counterpart loopback message, whichever is received first since a given loopback message and its counterpart loopback message will encode the same data. Each matching engine instance 140A and 140B can then ignore the later received loopback message or counterpart loopback message.

At 512, the method 500 may include expiring the order corresponding to the loopback message or the counterpart loopback message, wherein expiration of the order occurs on both the first instance and the second instance without blocking new messages from the sequencer.

Figure 6:
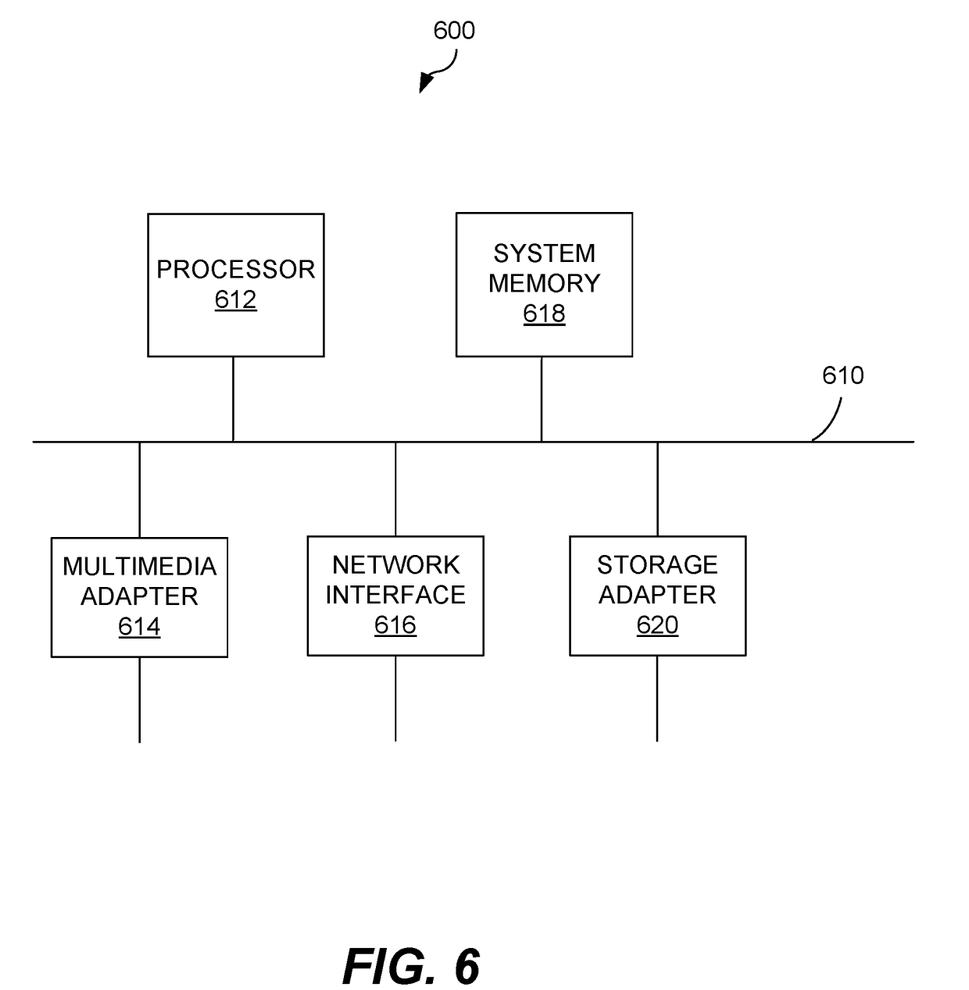
FIG. 6 illustrates an example of a computer system illustrated in FIG. 1.

FIG. 6 illustrates an example of a computer system 600 that may be implemented by the computer system illustrated in FIGS. 1 and 3. The computer system 600 may include, among other things, an interconnect 610, a processor 612, a multimedia adapter 614, a network interface 616, a system memory 618, and a storage adapter 620.

The interconnect 610 may interconnect various subsystems, elements, and/or components of the computer system 600. As shown, the interconnect 610 may be an abstraction that may represent any one or more separate physical buses, point-to-point connections, or both, connected by appropriate bridges, adapters, or controllers. In some examples, the interconnect 610 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1364 bus, or "firewire," or other similar interconnection element.

In some examples, the interconnect 610 may allow data communication between the processor 612 and system memory 618, which may include read-only memory (ROM) or flash memory (neither shown), random-access memory (RAM), and/or other non-transitory computer readable media (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 612 may control operations of the computer system 600. In some examples, the processor 612 may do so by executing instructions such as software or firmware stored in system memory 618 or other data via the storage adapter 620. In some examples, the processor 612 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 614 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 616 may provide the computer system 600 with an ability to communicate with a variety of remote devices over a network. The network interface 616 may include, for example, an Ethernet adapter, a Fibre Channel adapter, and/or other wired- or wireless-enabled adapter. The network interface 616 may provide a direct or indirect connection from one network element to another, and facilitate communication and between various network elements.

The storage adapter 620 may connect to a standard computer readable medium for storage and/or retrieval of information, such as a fixed disk drive (internal or external).

Other devices, components, elements, or subsystems (not illustrated) may be connected in a similar manner to the interconnect 610 or via a network. The network may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

The devices and subsystems can be interconnected in different ways from that shown in FIG. 6. Instructions to implement various examples and implementations described herein may be stored in computer-readable storage media such as one or more of system memory 618 or other storage. Instructions to implement the present disclosure may also be received via one or more interfaces and stored in memory. The operating system provided on computer system 600 may be MS-DOS®, MS-WINDOWS®, OS/2®, OS X®, IOS®, ANDROID®, UNIX®, Linux®, or another operating system.

In FIG. 1, as well as in other Figures, different numbers of entities than those depicted may be used. Furthermore, according to various implementations, the components described herein may be implemented in hardware and/or software that configure hardware.

For simplicity and illustrative purposes, the disclosure included descriptions that may refer to examples. In the description, numerous specific details have been set forth in object to provide a thorough understanding of the present disclosure. It will be readily apparent however, that the disclosure may be practiced without limitation to these specific details. In other instances, some methods and structures have not been described in detail so as not to unnecessarily obscure the present disclosure. In some instances, various method operations may be omitted and the various method operations are not necessarily performed in the order in which they are presented.

Throughout the disclosure, the term "a" and "an" may be intended to denote at least one of a particular element. As used herein, the term "includes" means includes but not limited to, the term "including" means including but not limited to. The term "based on" means based at least in part on. The term "a processor" and similar terminology is accordingly intended to mean "at least one processor." It would be understood that a computer system may include multiple processors housed together (such as a multi-core processor) or separate from one another (such as independent server blades operating together). A processor programmed to perform claimed features will therefore be understood to mean that a single processor may perform a first claim feature and another single processor may perform another (second) claim feature or that a single processor may perform both first and second claim features.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. As such, the disclosure is intended to be defined by the following claims—and their equivalents—in which all terms are meant in their broadest reasonable sense unless otherwise indicated.

What is claimed is:

1. A system for pause-less end-of-interval messaging with failover protection, comprising:
   one or more processors programmed to execute a first instance of a matching engine and a second instance of the matching engine, the first instance and the second instance executing on the same or different processors of the system, wherein the second instance is a backup instance for fault tolerance if the first instance becomes unavailable;
   wherein each of the first instance and the second instance is programmed to:
      receive a plurality of messages over time from a sequencer, each message of the plurality of messages identifying a respective order from a participant to be matched with another order via the matching engine and having been sequenced with respect to other messages of the plurality of messages, wherein each order has an expiration after which the order should no longer be matched;
      receive, from the sequencer, an end-of-interval (EOI) rollover message associated with an EOI expiration that indicates orders that have expired based on a respective expiration of the order and the EOI expiration are to be expired and no longer matched to other orders;
      responsive to the EOI rollover message:
      identify a to-be-expired order based on its expiration,
      generate a loopback message that identifies the to-be-expired order without expiring the to-be-expired order while continuing to receive new messages for new orders from the sequencer, and
      transmit the loopback message to the sequencer, which will sequence the loopback message along with new messages for new orders that are received after the EOI rollover message;
      receive one or more new messages from the sequencer;
      determine that at least one new message of the one or more new messages is the loopback message or a counterpart loopback message sent to the sequencer by the other instance of the matching engine; and
      expire the order corresponding to the loopback message or the counterpart loopback message, wherein expiration of the order occurs on both the first instance and the second instance without blocking new messages from the sequencer.

2. The system of claim 1, wherein the first instance and the second instance each is to:
   store the plurality of messages, as they are received, in a message log; and
   responsive to receipt of the EOI rollover message, generate a current EOI snapshot based on the plurality of messages in the message log to maintain a snapshot of messages received in a current EOI time period, the current EOI snapshot being used to recover messages received during the time period before the EOI rollover message is received and after a prior EOI rollover message was received.

3. The system of claim 1, wherein the first instance and the second instance each accesses a respective loopback message send queue, and each of the first instance and the second instance is to:
- add the loopback message to the respective loopback message send queue along with other loopback messages that each identify a respective to-be-expired order;
- wherein to transmit the loopback message to the sequencer, the first instance and the second instance each transmit the loopback message from its respective loopback message send queue.

4. The system of claim 3, wherein to transmit the loopback message from its respective loopback message send queue, each of the first instance and the second instance is to:
- execute a throttling thread that transmits the loopback message from its respective loopback message send queue based on one or more throttling parameters that define a number or rate of loopback messages to be transmitted to the sequencer to control the number or rate of loopback messages that are transmitted to the sequencer from each of the first instance and the second instance.

5. The system of claim 1, wherein each of the first instance and the second instance is to:
- after the EOI rollover message is received, receive a new message from the sequencer, the new message comprising a new order to be matched; and
- process the new order to be matched without pause while continuing to process the EOI rollover message.

6. The system of claim 5, wherein each of the first instance and the second instance is to:
- determine that the new order specifies a counter-part order that is-to-be expired; and
- expire the counter-part order.

7. The system of claim 6, wherein each of the first instance and the second instance is to:
- determine that all to-be-expired orders have been expired; and
- transmit a rollover completed loopback message indicating that all of the to-be-expired orders have been expired.

8. The system of claim 1, wherein the at least one new message of the one or more new messages is the loopback message.

9. The system of claim 1, wherein the at least one new message of the one or more new messages is the counterpart loopback message.

10. The system of claim 1, wherein each of the first instance and the second instance is to:
- add the plurality of messages and the one or more new messages into a respective inbound message queue.

11. The system of claim 1, wherein the one or more processors are further programmed to execute a sequencer, the sequencer to:
- receive a plurality of messages from (i) one or more market participants and/or (ii) the first instance and the second instance;
- sequence the plurality of messages; and
- transmit the sequenced plurality of messages to each of the first instance and the second instance.

12. The system of claim 1, wherein the one or more processors are further programmed to execute a sequencer, the sequencer to:
- transmit an EOI rollover message to each of the first and second instances to indicate that an EOI rollover is to occur.

13. A method, comprising:
- receiving, by a matching engine instance of a computer system, a plurality of messages over time from a sequencer, each message of the plurality of messages identifying a respective order from a participant to be matched with another order via the matching engine and having been sequenced with respect to other messages of the plurality of messages, wherein each order has an expiration after which the order should no longer be matched;
- receiving, by the matching engine instance from the sequencer, an end-of-interval (EOI) rollover message associated with an EOI expiration that indicates orders that have expired based on a respective expiration of the order and the EOI expiration are to be expired and no longer matched to other orders;
- responsive to the EOI rollover message:
- identifying, by the matching engine instance, a to-be-expired order based on its expiration,
- generating, by the matching engine instance, a loopback message that identifies the to-be-expired order without expiring the to-be-expired order while continuing to receive new messages for new orders from the sequencer, and
- transmitting, by the matching engine instance, the loopback message to the sequencer, which will sequence the loopback message along with new messages for new orders that are received after the EOI rollover message;
- receiving, by the matching engine instance, one or more new messages from the sequencer;
- determining, by the matching engine instance, that at least one new message of the one or more new messages is the loopback message or a counterpart loopback message sent to the sequencer by the other instance of the matching engine; and
- expiring, by the matching engine instance, the order corresponding to the loopback message or the counterpart loopback message, wherein expiration of the order occurs without blocking new messages from the sequencer.

14. The method of claim 13, further comprising:
- storing the plurality of messages, as they are received, in a message log; and
- responsive to receipt of the EOI rollover message, generating a current EOI snapshot based on the plurality of messages in the message log to maintain a snapshot of messages received in a current EOI time period, the current EOI snapshot being used to recover messages received during the time period before the EOI rollover message is received and after a prior EOI rollover message was received.

15. The method of claim 13, further comprising:
- accessing a respective loopback message send queue;
- adding the loopback message to the respective loopback message send queue along with other loopback messages that each identify a respective to-be-expired order;
- wherein to transmit the loopback message to the sequencer, the first instance and the second instance each transmit the loopback message from its respective loopback message send queue.

16. The method of claim 15, wherein transmitting the loopback message comprises:

executing a throttling threat that transmits the loopback message from its respective loopback message send queue based on one or more throttling parameters that define a number or rate of loopback messages to be transmitted to the sequencer to control the number or rate of loopback messages that are transmitted to the sequencer from each of the first instance and the second instance.

17. The method of claim 13, further comprising:

after the EOI rollover message is received, receiving a new message from the sequencer, the new message comprising a new order to be matched; and processing the new order to be matched without pause while continuing to process the EOI rollover message.

18. The method of claim 17, further comprising:

determining that the new order specifies a counter-part order that is-to-be expired; and expiring the counter-part order.

19. The method of claim 18, further comprising:

determining that all to-be-expired orders have been expired; and transmitting a rollover completed loopback message indicating that all of the to-be-expired orders have been expired.

20. The method of claim 13, further comprising:

receiving, by a sequencer of the computer system, a plurality of messages from (i) one or more market participants and/or (ii) the first instance and the second instance;

sequencing, by the sequencer, the plurality of messages; and transmitting, by the sequencer, the sequenced plurality of messages to each of the first instance and the second instance.

* * * * *